(12) United States Patent
Hoerentrup et al.

(10) Patent No.: US 8,607,160 B2
(45) Date of Patent: *Dec. 10, 2013

(54) METHOD FOR PRESENTING MENU BUTTONS

(71) Applicant: Thomson Licensing, Issy de Moulineaux (FR)

(72) Inventors: Jobst Hoerentrup, Wennigsen (DE); Ralf Ostermann, Hannover (DE); Harald Schiller, Hannover (DE); Dirk Gandolph, Ronnenberg (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/896,405

(22) Filed: May 17, 2013

(65) Prior Publication Data

US 2013/0268896 A1 Oct. 10, 2013

Related U.S. Application Data

(63) Continuation of application No. 10/552,025, filed on Jul. 28, 2006, now Pat. No. 8,479,119.

(30) Foreign Application Priority Data

Apr. 3, 2003 (EP) .................................... 03007665
Mar. 22, 2004 (WO) .................. PCT/EP2004/002997

(51) Int. Cl.
*G06F 3/048* (2013.01)

(52) U.S. Cl.
USPC ............ 715/810; 715/825; 715/719; 715/721

(58) Field of Classification Search
USPC .................................. 715/810, 825, 719, 721
See application file for complete search history.

(56) References Cited

U.S. PATENT DOCUMENTS 5,929,857 A 7/1999 Dinallo et al.
6,154,209 A 11/2000 Naughton et al.

FOREIGN PATENT DOCUMENTS

| EP | 0920017 A2 | 6/1999 |
| EP | 1164797 A1 | 12/2001 |
| JP | 11-272384 | 10/1991 |
| JP | 2001-521324 | 11/2001 |
| JP | 2003-9031 | 1/2003 |
| WO | 99/21308 | 4/1999 |
| WO | 01/15168 A1 | 3/2001 |
| WO | 01/35412 A1 | 5/2001 |

OTHER PUBLICATIONS

Tanaka, T., "Power Up Visual Basic Net Advanced Course", Oct. 2, 1993, 14 pages.

(Continued)

*Primary Examiner* — Andrey Belousov
(74) *Attorney, Agent, or Firm* — Robert D. Shedd; Reitsend Lin

(57) ABSTRACT

Optical storage media often contain data structures for a menu suitable for selection of a title, a chapter, a parameter or others. Such menus usually comprise a number of buttons to be displayed, with each button having a state. Possible states of buttons are; e.g., "unselected", "selected" or "activated". According to the invention, the menu may contain buttons that can be selected through the keys on the remote control, but that don't have any images or text associated. This allows creating "invisible buttons" that automatically execute commands upon selection. Further, a sound or sound sequence; e.g., melody or click, may be associated to a buttons state, and may be played back when the button enters this state. Such menu data may be stored; e.g., on a Blu-ray disc.

1 Claim, 1 Drawing Sheet

(56) References Cited

OTHER PUBLICATIONS

"DVD Player DVD-V7200 Operating Instructions (Basic Operations)", 1998 Pioneer Electronic Corporation pp. 1-55, especially pp. 20-21.
jIGui, Java Music Player, version 2.1.1, Apr. 1, 2002, 1 page; http://web.archive.org/web/20021012174158/www.javazoom.net/jlgui/sources.html.
Piroumian, Vartan, Java™ GUI Development, the Authoritative Solution, Copyright (c) 1999 by Sams Publishing, pp. 1-9.
Piroumian, Vartan, Java GUI Development, the Authoritative Solution, Copyright 1999, Sams Publishing, pp. 1-19.
Java™ 2 Platform, Standard Edition, Copyright 1993-1999, v1.2.2 API Specification: Class JMenuItem, pp. 1-13.
Java™ 2 Platform, Standard Edition. Copyright 1993-1999, v1.2.2 API Specification: Class Component, pp. 1-59.
Java™ 2 Platform, Standard Edition, Copyright 1993-1999, v1.2.2 API Specification: Class JComponent, pp. 1-42.
Search Report dated May 12, 2005.

METHOD FOR PRESENTING MENU BUTTONS

This application is a Continuation of co-pending U.S. patent application Ser. No. 10/552,025, filed Jul. 28, 2006, incorporated herein by reference.

FIELD OF THE INVENTION

This invention relates to a method for presenting menu buttons for an optical storage medium.

BACKGROUND

Today's optical storage media formats are capable of supporting visual menus, e.g. for content management or control functions. Applications of such visual menus are the selection of one out of multiple titles on the disc, the selection of a chapter within a title, and others. From the user perspective, such menus consist of a number of buttons shown on the display. The user may navigate within the menu, e.g. by pushing the UP, DOWN, LEFT and RIGHT buttons on his remote control to select a menu button and thus using defined neighborhood relations between buttons, and may activate a menu button through some kind of "OK" button on the remote control. An indicator, usually a highlight or an arrow, may provide feedback to the user, showing which button is currently selected or activated. A menu button may have one of the states "normal", "selected" or "activated".

However, known DVD menus are rather limited concerning extra features, since they contain only static visual buttons.

Further, a subtitling specification contained in the document "ETS 300 743: Digital Video Broadcasting (DVB); Subtitling System" (DVB-ST), provided by the European Telecommunication Standardization Institute (ETSI), is known for embedding subtitles into video sequences.

SUMMARY OF THE INVENTION

The present invention may provide to the user who operates an electronic menu related to an optical storage medium a more flexible menu system than known from DVD-Video. Particularly, the disclosed method allows operating menu buttons that are not being displayed, as disclosed in claim 1. Further, a method is disclosed to enhance menu pages by adding non-button objects, e.g. text or graphical symbols. Usually the menu data will be read from the storage medium and processed by an appropriate processing device, so that the data can be used for creating a menu for controlling e.g. a presentation of audio and/or video data stored on the medium.

According to the invention, only some buttons of an electronic menu are shown on a display, while the menu may comprise further functions that are not represented by buttons on the display, but the further functions may also be activated via a user interface. Additionally, a sound or sound sequence may be attached to some or all menu buttons, depending on the buttons state. Sounds are e.g. a click or a melody, or a speech sequence. The current invention also provides a data structure to describe the new features.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a multi-page visual menu including invisible buttons.

DETAILED DESCRIPTION OF THE INVENTION

The format for Blu-ray Pre-Recorded menus foresees 3 images for 3 button states. There is one image for the 'normal' button state, one image for the 'selected' button state and another image for the 'activated' button state. In addition to that it is foreseen that, similar to DVD-Video, buttons can be selected directly, e.g. through the numerical keys on the remote control.

This invention disclosure describes a solution for buttons that can be selected through the keys on the remote control, but that don't have any image associated with the "button". In a sense, this allows to create "invisible buttons". An invisible button typically has an association with a single remote control key, e.g. '0' through '9' or UP/DOWN/LEFT/RIGHT, and in addition to that, it has button commands associated with the button. If the remote control allows to input numbers other than '0'-'9', e.g. 10, 11, . . . , or −1, −2, −3, an invisible button can also have an association with such a multi-digit number.

Further, in one embodiment of the invention it is possible that one or more menu buttons are not displayable at all.

Amongst others, typical applications for this "invisible button" feature are multi-page menus, interactive games, or access control for content stored on a storage medium.

Multi-page menus are known as a group of menu pages that logically belong together, but are distributed to more than one visible page because otherwise the number of menu items per page would be too high. Usually buttons like "next", "more" or "previous" connect the single pages of a multi-page menu. Thus, in a multi-page menu the hierarchically equivalent buttons of one logical menu page are distributed to two or more visible pages, wherein the visible pages contain different buttons or combinations of buttons, like e.g. a chapter menu.

Figure 1:
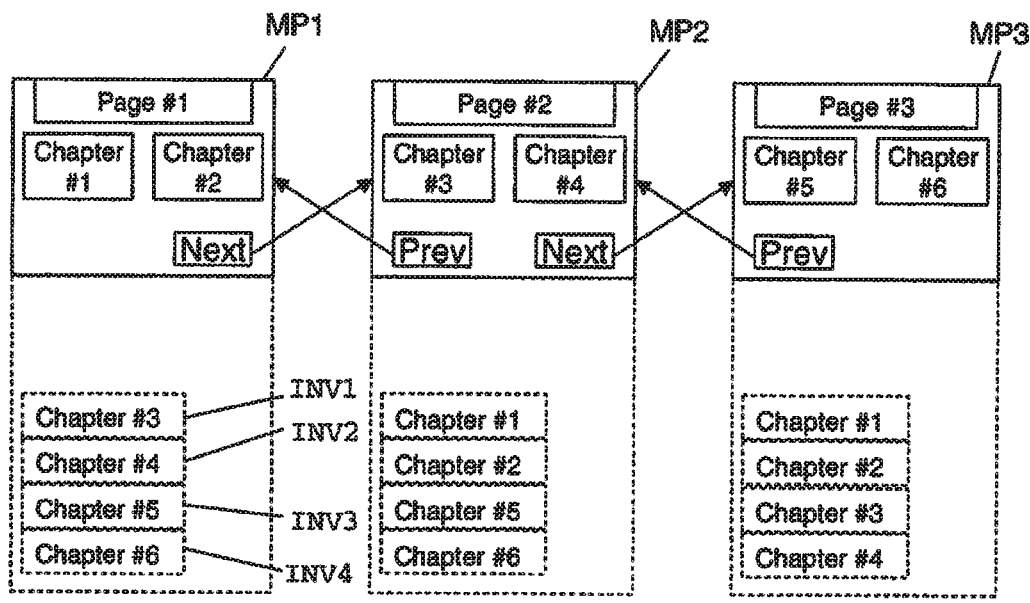

In case of multi-page menus, like for instance chapter menus, invisible buttons can be used to access chapters directly through remote control keys, without explicitly accessing the page that holds a visible button image for that chapter. This situation is shown in FIG. 1. In the example, the multi-page menu consists of 3 menu pages MP1,MP2,MP3. The menu allows users to have direct access to chapters on the disc. The first menu page MP1 holds 3 visible buttons, namely "Chapter #1", "Chapter #2" and "Next". In addition to the visible buttons, menu page MP1 also holds 4 invisible buttons INV1, . . . , INV4, namely "Chapter #3" INV1, "Chapter #4" INV2, "Chapter #5" INV3 and "Chapter #6" INV4. If the user presses the "1" key on the remote control while the first menu page MP1 is displayed, the visible button "Chapter #1" becomes activated. If the user presses the "4" key on the remote control, the invisible button "Chapter #4" INV2 becomes activated.

Because the number of chapters can be quite large, it is very beneficial if multi-digit numbers can be input through remote control keys.

Additionally, the visible buttons may be used as known from today's implementations. The user may select and activate one of the visible buttons, e.g. in FIG. 1 the "Chapter #1" button or the "Chapter #2" button, by pressing a "Selection Up/Down" key, and separately activate the selected button by pressing an "OK" key. Further, the user may switch to another menu page to be displayed, and select and activate one of the displayed menu buttons conventionally.

In the case of interactive games, invisible buttons can be used e.g. to let the user input some numbers that are used in multiple-choice games, but also to input some guessing result. One simple example of this application is a quiz game, where the user is asked to guess the age of the actress, or to guess the year when the automobile was invented.

Another advantage of invisible buttons is that menu items can be hidden, or secret. In disc media applications, this can be used to protect e.g. adult or private content from unauthorized access. In such a situation it is beneficial if the numbers that are input will not become visible on the screen. Thus, invisible buttons can be used.

Further, this invention disclosure describes a solution to insert other graphical objects, not being a button, into a menu page layout.

Figure 2:
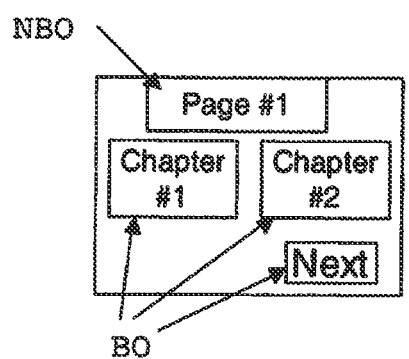
FIG. 2 a visual menu page including a non-button object.

Typical applications for this feature are menu screens that come with a title line, as shown in FIG. 1 and FIG. 2, or some other explanation that is laid out on the screen, but that is not intended to be selectable. FIG. 2 shows a menu screen including three button objects BO and a text field, with the text field being a non-button object NBO. Other than the button objects, non-button objects may not be selected or activated.

Both solutions together, invisible buttons and non-button objects, result in a solution that is more flexible than the menu system known from DVD-Video.

When the user presses on the remote control a key or key sequence corresponding to an invisible button, this can have two effects. In one embodiment of the invention, the invisible menu button is selected, and the selected menu button may be displayed on the screen. The associated function is executed when the user gives a confirmation, e.g. presses an "OK" button. In another embodiment the invisible menu button is activated and the corresponding function is executed without user confirmation.

An example for a menu page composition segment for Blu-ray discs is given in Tab.1. The semantics of the fields of the menu page composition segment is identical to that given in Section "7.2.1 Page composition segment" of the DVB-ST standard for fields of the same name. Additionally, the following semantic definitions apply.

All addressing of pixels is based on a coordinate system whose origin is defined by the top-left corner of the associated video. Pixel addresses increase from left to right and from top to bottom. The dimensions of the associated video are defined as video_width×video_height.

TABLE 1

Exemplary menu page composition segment

| Syntax | Size | Type |
|---|---|---|
| menu_page_composition_segment ( ) { | | |
|    sync_byte | 8 | bslbf |
|    segment_type | 8 | bslbf |
|    page_id | 16 | bslbf |
|    segment_length | 16 | uimsbf |
|    page_time_out | 32 | uimsbf |
|    selection_time_out | 32 | uimsbf |
|    UOP_mask | 64 | uimsbf |
|    animation_frame_rate_code | 4 | uimsbf |
|    page_version_number | 4 | uimsbf |
|    page_state | 2 | bslbf |
|    reserved | 6 | bslbf |
|    button_offset_number | 8 | uimsbf |
|    num_of_buttons | 8 | uimsbf |
|    num_of_numerical_select_buttons | 8 | uimsbf |
|    default_selected_button | 8 | uimsbf |
|    default_activated_button | 8 | uimsbf |

TABLE 1-continued

Exemplary menu page composition segment

| Syntax | Size | Type |
|---|---|---|
|    num_of_graphics | 8 | uimsbf |
|    for(button_id=0;button_id < | | |
|    num_of_buttons; button_id++) { | | |
|       visible_flag | 1 | bslbf |
|       reserved | 7 | bslbf |
|       If (visible_flag) { | | |
|          auto_action_mode | 8 | uimsbf |
|          button_horizontal_address | 16 | uimsbf |
|          button_vertical_address | 16 | uimsbf |
|          neighbour_info( ) { | | |
|             upper_button_id | 8 | uimsbf |
|             lower_button_id | 8 | uimsbf |
|             left_button_id | 8 | uimsbf |
|             right_button_id | 8 | uimsbf |
|          } | | |
|          normal_state_info( ) { | | |
|             start_region_id_normal | 8 | uimsbf |
|             end_region_id_normal | 8 | uimsbf |
|          } | | |
|          selected_state_info( ) { | | |
|             start_region_id_selected | 8 | uimsbf |
|             end_region_id_selected | 8 | uimsbf |
|          } | | |
|          action_state_info( ) { | | |
|             start_region_id_activated | 8 | uimsbf |
|             end_region_id_activated | 8 | uimsbf |
|          } | | |
|       } | | |
|       num_of_button_command_bytes | 8 | uimsbf |
|       for(i=0;i < num_of_button_command_bytes; | | |
|       i++) { | | |
|          button_command_data_byte( ) | | |
|       } | | |
|    } | | |
|    for(i=0;i < num_of_graphics; i++) { | | |
|       graphic_horizontal_address | 16 | uimsbf |
|       graphic_vertical_address | 16 | uimsbf |
|       graphic_start_region_id | 8 | uimsbf |
|       graphic_end_region_id | 8 | uimsbf |
|    } | | |
| } | | |

The menu page composition segment may be signalled by setting e.g. segment_type=0x18.

The page_time_out field indicates the time when the menu page composition segment becomes invalid, and the menu page should disappear from the screen. This value is measured in units of 90 kHz clock relative from the beginning of this menu page composition segment's presentation time stamp (PTS) and shall be put on frame grid.

The selection_time_out field indicates the time when the button selection valid period ends. This value is measured in units of 90 kHz clock relative from the beginning of this menu page composition segment's PTS and shall be put on frame grid. This value shall be smaller than page_time_out.

The UOP_mask field indicates the mask that prohibits some user operations. Each bit refers to a user operation and Least Significant Bit (LSB) refers to user operation #0. Each bit indicates prohibition of user operation as follows:
   0b—Corresponding user operation is permitted
   1b—Corresponding user operation is prohibited The button_offset_number field indicates the button offset number applied to all button_ids to calculate the user button number.

The num_of_buttons field indicates the number of buttons in this menu page.

The num_of_numerical_select_buttons field indicates the number of buttons that can be selected numerically by the user within this menu page.

The default_selected_button field indicates the button number that is selected by default when presentation of the menu page starts. When this value is set to e.g. 0xFF, no button is selected by default.

The default_activated_button field indicates the button number that is automatically activated when no button was activated by the user within the selection period. When this value is set to e.g. 0xFF, no button is automatically activated.

The num_of_graphics field indicates the number of additional graphical elements in this menu page. A graphical element is not selectable by the user and has no associated commands.

If the visible_flag is set to '1' it indicates that a button has a visual representation. For all buttons with button_id>num_of_numerical_select_buttons, this flag is set to '1'. In other words, if a button is not numerical selectable, it shall be visible. In a similar embodiment, an invisible button may be selectable by neighbourhood information, i.e. using the UP, DOWN, LEFT or RIGHT button when a button defined as neighbour is selected.

The auto_action_mode field indicates the operation mode of a button: if it is 0, the state of the corresponding button is transferred to the selected state when that button is selected. Otherwise, if it is 0x1, the state of the corresponding button is transferred to the activated state without displaying the selected button image when that button is selected. In the example shown in Tab.1 this is the implicit default state for all button objects. Only for visible buttons the auto_action_mode can be set to 0. A selected invisible button is therefore automatically activated, so that it may not remain in the selected state from which the user could not activate it because it is not visible.

The button_horizontal_address and button_vertical_address fields define the position where visible buttons are displayed on the screen.

The neighbour_info defines for each button object which other button objects are its neighbours, i.e. can be selected and/or activated using the UP, DOWN, LEFT and RIGHT buttons on the remote control.

The start_region_id and end_region_id fields define the storage address range, or region, where the one or more bitmap representations of the respective button in the respective state are stored.

The num_of_button_command_bytes field indicates the number of command bytes that are associated with the button.

The button_command_data_byte( ) field stores a single byte from a sequence of variable length ED-ROM commands. The sequence of commands is executed, when the corresponding button is activated, wherein activation can be explicit by a user or implicit by auto_action_mode, as described above.

The graphic_horizontal_address field specifies the horizontal address of the top left pixel of the graphical object. The specified horizontal position may be in the range between 0 and video_width−1.

The graphic_vertical_address field specifies the vertical address of the top left pixel of the graphical object. The specified vertical position may be in the range between 0 and video_height−1.

The graphic_start_region_id field specifies the ID of the first region, which may be presented for the graphical element.

The graphic_end_region_id field specifies the ID of the last region, which shall be presented for the graphical element. All regions with IDs between start_region_id and end_region_id shall exist; if start_region_id differs from end_region_id, that sequence of regions shall be presented cyclically with the animation frame rate described by animation_frame_rate_code.

As can be seen from Tab.1, the main components that conventionally characterize a button object are its graphical representation, its state and its associated function or button command. With the invention it is possible to create, within a menu whose menu pages are composed from separate objects, advanced menu functions through menu buttons that have no graphical representation. These invisible buttons may e.g. execute their commands automatically upon selection, thus changing their state from unselected to activated. Further, with the invention it is possible to create, within the given menu data structure, menu objects that are static, i.e. have only one possible state, namely unselected. Advantageously these non-button objects can utilize the same data structure than buttons, which allows easier decoders.

A decoder according to the invention is an apparatus for decoding an electronic menu, the menu comprising one or more menu pages and the menu pages comprising at least one menu button, the menu button having an associated state, wherein the possible states associated with a button may comprise unselected, selected or activated state, including
 means for identifying and separating, from a data segment being retrieved from a removable storage medium and representing the menu, separate data blocks relating to separate objects, the objects being menu buttons or non-button objects;
 means for generating a menu button object, the menu button object having an associated function and being not represented on the display; and
 means for changing the state of the menu button not represented on the display from unselected to activated upon a user pressing a key or key sequence on a remote control. Advantageously, the means for generating an invisible menu button object is the same as a means for generating a visible menu button object, due to their identical data structure.

In one embodiment of the invention it is possible that only non-button objects are displayed on a menu screen, while all buttons are invisible. When the user enters the menu mode by pressing an appropriate button, a non-button element, e.g. text or picture element, may be displayed in one region of the screen, indicating that menu mode is active. The user may get the information about which key to press for activating a menu button from another source, e.g. manual, or may have learned it from previous usage of the menu. It may also be default buttons, e.g. the UP, DOWN, LEFT and RIGHT buttons. E.g. it may also be possible to toggle the mode of one or more menu buttons between visible and invisible. Advantageously, with the inventive menu the currently presented video is less disturbed while the menu is accessed, e.g. for changing presentation preferences like subtitle language or font.

Advantageously, the invention also provides the possibility to give aural feedback to the user. If a button is either in the "selected" state or in the "activated" state, it may be assigned a sound identifier associated with a sound, which may be stored on the storage medium. The associated sound is played back when the button enters the respective button state. In one embodiment of the invention the associated sound is played back repeatedly, as long as the button is in the respective state.

The invention may be used particularly for menus stored on Blu-ray discs, but also DVD or other optical or non-optical high-capacity storage media. Further, it is interesting for pre-recorded media, i.e. read-only media or write-once media.

The invention claimed is:

1. A method for decoding a menu data segment, the method comprising the steps of
   detecting, within the menu data segment, data corresponding to a plurality of menu items belonging to a menu page;
   extracting from the menu data segment for each menu item of the plurality of menu items at least first data defining whether the menu item is selectable and second data defining whether the menu item has graphic representation data associated;
   decoding data corresponding to first menu items to selectable display data, wherein the first menu items are menu buttons and have graphic representation data associated;
   decoding data corresponding to second menu items to non-selectable and is visible display data, wherein the second menu items have graphic representation data associated; and
   decoding data corresponding to third menu items to selectable and invisible menu elements, wherein the third menu items have no associated graphic representation data, and wherein the third menu items are menu buttons that are automatically activated upon selection,
   wherein the menu data segment defines a multi-page menu, and wherein the first menu items are displayed for at least one, but not for every menu page of the multi-page menu.

* * * * *